(12) United States Patent
Li et al.

(10) Patent No.: US 11,953,793 B1
(45) Date of Patent: Apr. 9, 2024

(54) DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventors: Yanfen Li, Guangdong (CN); Lixuan Chen, Guangdong (CN); Xingwu Chen, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/176,018

(22) Filed: Feb. 28, 2023

(30) Foreign Application Priority Data

Dec. 30, 2022 (CN) .......................... 202211739725.3

(51) Int. Cl.
*G02F 1/1362* (2006.01)
*G02F 1/1368* (2006.01)

(52) U.S. Cl.
CPC .. *G02F 1/136209* (2013.01); *G02F 1/136286* (2013.01); *G02F 1/1368* (2013.01)

(58) Field of Classification Search
CPC ......... G02F 1/136209; G02F 1/136286; G02F 1/1368
See application file for complete search history.

(56) References Cited

U.S. PATENT DOCUMENTS

2015/0062507 A1* 3/2015 Park ................... G02F 1/133512
29/846
2018/0341055 A1* 11/2018 Yuan .................... G02B 6/0053

FOREIGN PATENT DOCUMENTS

JP H07333422 A * 12/1995

* cited by examiner

*Primary Examiner* — James A Dudek
(74) *Attorney, Agent, or Firm* — PV IP PC; Wei Te Chung; Zhigang Ma

(57) ABSTRACT

A display panel and a display module are provided. The display panel includes a first base, a black matrix layer, and a color resist layer, wherein the black matrix layer includes a plurality of openings, the color resist layer is disposed above the first base and filled in the plurality of openings. A light reflectivity of a side of the black matrix layer away from the first base is greater than a light reflectivity of a side of the black matrix layer close to the first base.

20 Claims, 5 Drawing Sheets

DISPLAY PANEL

CROSS-REFERENCE TO RELATED APPLICATION

This application claims priority to Chinese Patent Application No. 202211739725.3, filed Dec. 30, 2022, titled "DISPLAY PANEL", which is incorporated herein by reference in its entirety.

TECHNICAL FIELD

The present application relates to the field of manufacturing a display panel and a display device, and more particularly, to a display panel.

BACKGROUND

A liquid crystal display (LCD) display panel is widely used in various display fields due to its wide application and high practicability.

With the popularity of the 5G network and the advent of the big data, higher demands have been placed on the display screen. The 5G network means that data can be transmitted more and faster. The resolution of the liquid crystal display panel is therefore also required to be higher. For a high-resolution 8K liquid crystal display, an additional backlight source is required, and a light emitted from the backlight sequentially passes through a multilayer film layer structure including a lower polarizer, a thin film transistor base, a liquid crystal layer, a color film base, and an upper polarizer and the like, and finally the light enters our eyes and is captured by a human eye. In order to prepare a high-resolution liquid crystal display, it is necessary to dispose each layer of the multilayer film layer structure with different structures to achieve optimal performance. For example, in designing the structure of the black matrix (BM) layer, the material of the black matrix layer is mainly selected as a composite resin material. The composite resin material can better separate the color resistances of adjacent different colors and prevent color mixing or light leakage. Therefore, it is generally necessary to increase the thickness and width of the black matrix layer in the conventional design. As the size of the black matrix layer is increased, the light-shielding area is also increased, thereby reducing the amount of light emitted out of the panel and the utilization rate of the light, which is detrimental to the further improvement of the display effect of the display panel, and cannot meet the requirements of the users.

In conventional design of the LCD panel, the black matrix layer is formed with a relatively large size, and the light-shielding area is relatively large, which is further detrimental to the display effect of the display panel.

SUMMARY

An embodiment of the present application provides a display panel. A black matrix and layers corresponding to the black matrix in the display panel are improved so as to effectively reduce shielding of lights from the black matrix layer, and improve an aperture ratio and a display effect of the display panel.

The present application provides a display panel including: a first base; a black matrix layer disposed on the first base, wherein the black matrix layer includes a plurality of openings; and a color resist layer disposed on the first base and filled in the plurality of openings; wherein a light reflectivity of a side of the black matrix layer away from the first base is greater than a light reflectivity of a side of the black matrix layer close to the first base.

According to an embodiment of the present application, the black matrix layer includes a first reflective and a second reflective layer, the second reflective layer is disposed on the first base, and the first reflective layer is disposed on a side of the second reflective layer away from the first base; wherein a light reflectivity of the first reflective layer is greater than a light reflectivity of the second reflective layer.

According to an embodiment of the present application, the first reflective layer and the second reflective layer each comprise at least one metal layer.

According to an embodiment of the present application, a number of metal layers in the second reflective layer is greater than a number of metal layers in the first reflective layer.

According to an embodiment of the present application, the first reflective layer includes: a first dielectric layer; a second dielectric layer disposed on the first dielectric layer; and a first metal layer disposed on the second dielectric layer. The second reflective layer includes: a third dielectric layer disposed on the first metal layer; a second metal layer disposed on the third dielectric layer; a fourth dielectric layer disposed on the second metal layer; a third metal layer disposed on the fourth dielectric layer; and a fifth dielectric layer disposed on the third metal layer and adhered to the color resist layer.

According to an embodiment of the present application, the first metal layer is made of any one of gold and silver, and the second metal layer and the third metal layer are made of same metal material.

According to an embodiment of the present application, a thickness of the second metal layer is greater than a thickness of the first metal layer and a thickness of the third metal layer, and the thickness of the first metal layer is greater than the thickness of the third metal layer. The thickness of the third metal is less than the thickness of the fourth dielectric layer and the thickness of the fifth dielectric layer, and the thickness of the third dielectric is less than the thickness of the fourth dielectric layer and the thickness of the fifth dielectric layer. The thickness of the first metal layer is greater than a thickness of the first dielectric layer and a thickness of the second dielectric layer.

According to an embodiment of the present application, the second reflective layer further comprises light-absorbing particles.

According to an embodiment of the present application, the light-absorbing particles are included in the fourth dielectric layer or the fifth fourth dielectric layer.

According to an embodiment of the present application, the light-absorbing particles are included in the third dielectric layer, the fourth dielectric layer and the fifth fourth dielectric layer; wherein the light-absorbing particles included in the fifth dielectric layer are denser than the light-absorbing particles included in the fourth dielectric layer, and the light-absorbing particles included in the fourth dielectric layer are denser than the light-absorbing particles included in the third dielectric layer.

According to an embodiment of the present application, the light reflectivity of the first reflective layer is greater than 95%, and the light reflectivity of the second reflective layer is less than 5%

According to an embodiment of the present application, a width of the black matrix layer ranges from 10 μm to 100 μm, and a thickness of the black matrix layer is less than 1 μm.

According to an embodiment of the present application, the display panel further includes: a substrate, a thin film transistor array layer disposed on the substrate, a liquid crystal layer disposed on the thin film transistor array layer, a metal trace disposed on the thin film transistor array layer and covered by the liquid crystal layer, and a passivation layer disposed on the liquid crystal layer; wherein a width of the black matrix layer is greater than a width of the metal trace.

The present application provides a display module including the display panel above, a light-guiding plate and a light source, wherein the light-guiding plate is disposed under the display panel, and the light source is disposed under the light-guiding plate.

According to an embodiment of the present application, the black matrix layer comprises a first reflective and a second reflective layer, the second reflective layer is disposed on the first base, and the first reflective layer is disposed on a side of the second reflective layer away from the first base; wherein a light reflectivity of the first reflective layer is greater than a light reflectivity of the second reflective layer.

A display panel is provided according to an embodiment of the present application. The display panel includes a first base, a black matrix layer, and a color resist layer. The black matrix layer includes a plurality of openings, and the color resist layer is filled in the plurality of openings correspondingly. A light reflectivity of a side of the black matrix layer away from the first base is greater than a light reflectivity of a side of the black matrix layer close to the first base. In the embodiment of the present application, different sides of the black matrix layer are provided with different light reflectivity, and the structure of the black matrix layer is improved, so that the black matrix layer can reflect the lights while having a good light-shielding effect. The lights can be reflected by the black matrix layer and transmitted again in the display panel, thereby effectively improving the light-emitting effect of the display panel, and improving the display effect and the comprehensive performance of the display panel.

BRIEF DESCRIPTION OF THE DRAWINGS

In order to make the embodiments of the present disclosure or the technical solutions in the prior art more clearly, reference will now be made to the accompanying drawings used in the description of the embodiments or the prior art, and it will be apparent that the accompanying drawings in the description below are merely some of the embodiments of the present disclosure, and other drawings may be made to those skilled in the art without any inventive effort.

DETAILED DESCRIPTION OF THE EMBODIMENTS

Figure 1:
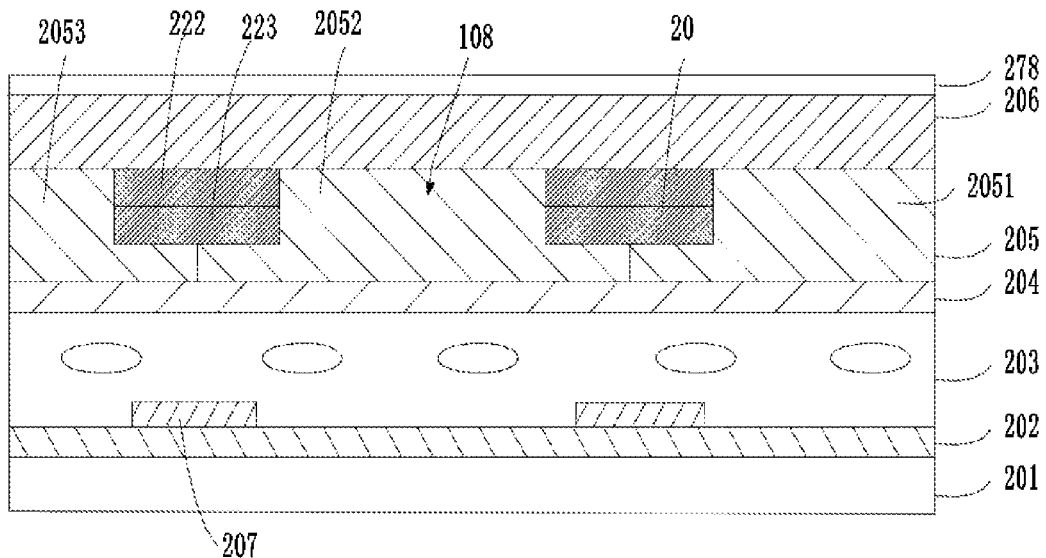
FIG. 1 is a schematic diagram of a film layer structure of a display panel according to an embodiment of the present application.

The following disclosure, taken in conjunction with the accompanying drawings, provides different embodiments or examples to implement different structures of the application. In order to simplify the present application, components and arrangements of specific examples are described below. Furthermore, the various examples of specific processes and materials provided by the present application will be appreciated by those of ordinary skill in the art of other process applications. All other embodiments obtained by those skilled in the art without inventive effort are within the scope of the present application.

In the description of the present application, it is to be understood that the azimuth or positional relationship indicated by the terms "center", "longitudinal", "transverse", "length", "width", "thickness", "up", "down", "front", "back", "left", "right", "vertical", "horizontal", "top", "bottom", "inner", "outer", "clockwise", "counterclockwise", and the like, is based on the azimuth or positional relationship shown in the drawings, merely to facilitate description of the present application and to simplify the description, and is not intended to indicate or imply that the device or element referred to must have a particular azimuth, be constructed and operated in a particular azimuth, and therefore is not to be construed as limiting the present application. Furthermore, the terms "first" and "second" are used for descriptive purposes only and are not to be construed as indicating or implying relative importance or implying the number of indicated technical features.

During preparing a conventional liquid crystal display panel, the size of the black matrix layer in the panel is generally large, which further shields more lights, and reduces the aperture ratio of the panel, which is detrimental to further improving the display effect and the comprehensive performance of the display panel.

An embodiment of the present application provides a display panel in which a film layer structure in the display panel is improved so as to effectively improve the performance of a black matrix layer, and to improve the comprehensive performance such as the aperture ratio and the light-emitting effect of the display panel.

References are made with FIG. 1, wherein FIG. 1 is a schematic diagram of a film layer structure in a display panel according to an embodiment of the present application. Specifically, the film layer structure in the display panel may include a substrate 201, a thin film transistor array layer 202, a liquid crystal layer 203, a passivation layer 204, a color resist layer 205, a black matrix layer 20, a first base 206, and a polarizer 278.

In the embodiment of the present application, the first base 206 is a color film base. A plurality of thin film transistors is provided on the thin film transistor array layer 202. The display panel is driven and controlled by the plurality of thin film transistors. In this case, it is possible to arrange the thin film transistor array layer according to the preparation and the corresponding structure of the thin film transistor array layer in the existing art, and details are not described herein.

In the embodiment of the present application, the display panel further includes a metal trace 207. When the lights in the backlight passes through the metal trace 207, it is shielded by the metal trace 207, so that some of the lights cannot be transmitted and the light-emitting effect is affected. In addition, the width of the metal trace 207, the width of the corresponding black matrix layer 20, and the distance between the metal trace 207 and the corresponding black matrix layer 20 all affect the light-exiting angle. In the embodiment of the present application, the film layer structure and the corresponding size of the black matrix layer 20 are improved to change the relative positional relationship between the metal trace 207 and the corresponding black matrix layer 20, as such, the exiting-angle of the lights emitted from the metal trace 207 and the corresponding black matrix layer 20 is expanded, and the light-emitting effect is improved.

Further, in the embodiment of the present application, the passivation layer 204 is further provided on the color resist layer 205. The color resist layer 205 is provided to provide different colors of the display panel. Specifically, in the following embodiments, the color resist layer 205 may include a plurality of color resistors of different colors, for example, the color resist layer 205 includes a red color resist 2051, a blue color resist 2052, and a green color resist 2053. The red color resist 2051, the blue color resist 2052, and the green color resist 2053 are sequentially provided in different areas. When the lights in the display panel passes through the color resist layer of different colors, the different colors are provided, thereby ensuring the color display of the display panel. Preferably, the color resist of the different colors may be arranged according to the requirements of the actual product, for example, the adjacent color resists may be arranged with the different colors, or the adjacent color resists may be arranged with same color, and details are not described herein.

Specifically, the black matrix layer 20 is provided between adjacent two color resists. The black matrix layer 20 is patterned to form an opening 108 between adjacent two black matrix layers 20. When the lights emit out from the substrate 201, the lights emitted from the area corresponding to the opening 108 can transmit directly through the opening 108. However, the lights emitted from the area corresponding to the black matrix layer 20 cannot transmit through this area due to the shielding of the black matrix layer 20. Further, the light-shielding purpose of the black matrix layer 20 is achieved.

In the embodiment of the present application, the size of the opening 108 affects the light-emitting effect of the display panel. In a case that the opening 108 is relatively large, the aperture ratio of the display panel is large, and the lights in the panel can be transmitted through the opening 108 as much as possible for a better display effect. In a case that the opening 108 is relatively small, only a part of or a small amount of the lights can be transmitted through the opening, but most of the lights is shielded by the black matrix layer, thereby reducing the display effect of the display panel. In the embodiment of the present application, the structure of the black matrix layer is improved, and the lights in the panel is reflected by the black matrix layer for reuse, thereby effectively improving the display effect of the display panel.

Further, the polarizer 278 is provided on the first base 206 to form the display panel in the embodiment of the present application.

In the embodiment of the present application, in order to improve the display effect of the display panel, the black matrix layer 20 is provided. Moreover, the light reflectivity of a side of the black matrix layer 20 away from the first base 206 is greater than the light reflectivity of a side of the black matrix layer 20 is close to the first base 206. In this way, when the lights transmitted through the liquid crystal layer reach a side of the black matrix layer 20, the lights can be reflected back for reuse.

Specifically, the black matrix layer 20 may include a plurality of reflective layers, for example, the black matrix layer includes a first reflective layer and a second reflective layer. And the first reflective layer and the second reflective layer have different light reflectivity. Specifically, the light reflectivity of the reflective layer on a side close to the liquid crystal layer of the display panel is greater than the light reflectivity of the reflective layer on a side away from the liquid crystal layer. When the lights reach different reflective layers, different light-reflecting effect is provided, so that the utilization rate of the lights in the display panel is improved by the different reflective layers, and the display effect of the display panel is effectively improved.

As shown in FIG. 1, the black matrix layer 20 is patterned and disposed on a side of the first base 206. The black matrix layer 20 includes a plurality of openings 108 through which the lights in the display panel may be transmitted.

Meanwhile, the first base 206 and the black matrix layer 20 are further provided with the color resist layer 205, and the color resist layer 205 is filled in the opening 108. In embodiments of the present application, the color resists of the same color or different colors may be provided in a plurality of different openings 108. In the embodiment of the present application, three adjacent openings 108 are provided as an example, and red color resist 2051, blue color resist 2052, and green color resist 2053 are sequentially provided from left to right in FIG. 0.1. Alternatively, other types of color resists may be provided in different openings 108, depending on the needs of different uses.

At the same time, the opening area of each opening 108 may be the same. Alternatively, the opening areas of different openings 108 may be different sizes according to actual product requirements, and specifically may be adjusted according to requirements. The details are not described herein.

In the embodiment of the present application, in a case that the black matrix layer 20 is provided, the height of the black matrix layer 20 may be the same as the height of the color resist layer 205. In a case that the black matrix layer 20 and the color resist layer 205 are in a same height, the upper surface of the black matrix layer 20 and the upper surface of the color resist layer 205 are on the same plane, and the lower surface of the black matrix layer 20 and the lower surface of the color resist layer 205 are also on the same plane.

In an embodiment, the height of the black matrix layer 20 may also be different from the height of the color resist layer 205, e.g., the height of the black matrix layer 20 is less than the height of the color resist layer 205. At this time, the lower surface of the black matrix layer 20 is flush with the lower surface of the color resist layer 205, and the portion of the color resist layer 205 covers the corresponding black matrix layer 20.

Specifically, the black matrix layer 20 is covered with adjacent two color resists. A left black matrix layer 20 in FIG. 1 is taken as an example, in this case, the black matrix layer 20 is covered with the blue color resist 2052 and a green color resist 2053 correspondingly above this black matrix layer 20. In the embodiment of the present application, in a case that the black matrix layer 20 is provided, the height of the black matrix layer 20 is at least half the height of the color resist layer 205, thereby ensuring the light-shielding effect of the black matrix layer 20.

In the embodiment of the present application, in a case that the above-described black matrix layer 20 is provided, the black matrix layer 20 includes a first reflective layer 222 and a second reflective layer 223, and the first reflective layer 222 and the second reflective layer 223 are stacked. For example, the first reflective layer 222 may be disposed above or below the second reflective layer 223. Specifically, the second reflective layer 223 is disposed on the first base 206, while the first reflective layer 222 is disposed on a side of the second reflective layer 223 away from the first base 206. After two parts of the display panel are made into a cell, the first reflective layer 222 is disposed close to the liquid crystal layer of the display panel, and the light reflectivity of the first reflective layer 222 is greater than the light reflectivity of the second reflective layer 223.

Specifically, the thickness of the first reflective layer 222 is less than the thickness of the second reflective layer 223. Preferably, the thickness of the first reflective layer 222 ranges from 80 nm to 110 nm, while the thickness of the second reflective layer 223 ranges from 200 nm to 300 nm. In the embodiment of the present application, the thickness of the first reflective layer 222 is 110 nm, and the thickness of the second reflective layer 223 is 270 nm. Thus, while the light-shielding effect of the black matrix layer 20 is ensured, the display panel is lighter and thinner, and the comprehensive performance of the display panel is effectively improved.

Preferably, the light reflectivity of the first reflective layer 222 may be greater than 95%, and the light reflectivity of the second reflective layer 223 may be less than 5%. Specifically, in the embodiment of the present application, the light reflectivity of the first reflective layer 222 is set to 97%, and the light reflectivity of the second reflective layer 223 is set to 4%. In this case, both the first reflective layer 222 and the second reflective layer 223 satisfy the above performance requirements.

In the embodiment of the present application, in a case that the black matrix layer 20 is provided, the first reflective layer 222 and the second reflective layer 223 may be directly stacked. Alternatively, at least one separate layer may be further provided between the first reflective layer 222 and the second reflective layer 223. At this time, the separate layer is provided on the second reflective layer 223, while the first reflective layer 222 is provided on the separate layer. The details of the separate layer are not shown in Figures, and may be provided in accordance with the above-described film layer structure. By the separate layer to separate two different reflective layers, the problem of mutual interference between the first reflective layer 222 and the second reflective layer 223 is prevented.

Further, in the embodiment of the present application, the first reflective layer 222 and the second reflective layer 223 each include at least one metal layer. Specifically, the number of metal layers in the second reflective layer 223 may be greater than the number of metal layers in the first reflective layer 222. Different metal layers are provided in the first reflective layer 222 and the second reflective layer 223 to improve the light-reflecting effect thereof. The metal layers in the different reflective layers may be provided as metal layers of different materials, and the number of metal layers may be provided according to the requirements of the actual product, which is not specifically limited herein.

In the following embodiment and example, one metal layer is provided in the first reflective layer 222, and two metal layers are provided in the second reflective layer 223.

Figure 2:
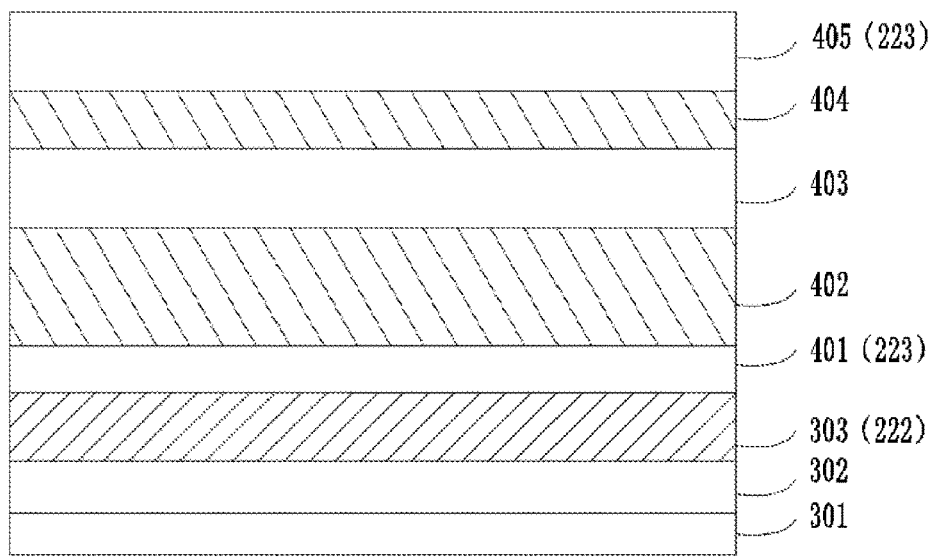
FIG. 2 is a schematic diagram of a film layer structure of a black matrix layer according to an embodiment of the present application.

Specifically, as shown in FIG. 2, FIG. 2 is a schematic diagram of a film layer structure of a black matrix layer according to an embodiment of the present application. Specifically, the first reflective layer 222 includes a first dielectric layer 301, a second dielectric layer 302, and a first metal layer 303. The first dielectric layer 301 is disposed on a side away from the second reflective layer 223, the second dielectric layer 302 is disposed on the first dielectric layer 301, and the first metal layer 303 is disposed on the second dielectric layer 302. The second reflective layer 223 is disposed on the first metal layer 303.

Further, the second reflective layer 223 includes a third dielectric layer 401, a second metal layer 402, a fourth dielectric layer 403, a third metal layer 404, and a fifth dielectric layer 405. Specifically, the third dielectric layer 401 is disposed on the first metal layer 303, the second metal layer 402 is disposed on the third dielectric layer 401, the fourth dielectric layer 403 is disposed on the second metal layer 402, and the third metal layer 404 is disposed on the fourth dielectric layer 403. At the same time, the fifth dielectric layer 405 is disposed on the third metal layer 404, the fifth dielectric layer 405 directly adheres to the first base 206, and finally forms the black matrix layer 20 provided in the embodiment of the present application. In the embodiment of the present application, by providing a plurality of dielectric layers, reflective function of different reflective layers is effectively ensured. The material of each of the dielectric layers may be inorganic material, for example, SiOx or SiNx material. Meanwhile, the number of the dielectric layers may be set depending on needs to improve the light-shielding effect of the black matrix layer 20.

In the embodiment of the present application, each of the metal layers and each of the dielectric layers have different thicknesses. Specifically, in the second reflective layer 223, the thickness of the second metal layer 402 is greater than the thickness of the other layers. For example, the thickness of the second metal layer 402 is greater than the thickness of the third metal layer 404, the thickness of the third metal layer 404 is less than the thickness of the fourth dielectric layer 403 and the thickness of the fifth dielectric layer 405, and the thickness of the third dielectric layer 401 is less than the thickness of the fourth dielectric layer 403 and the thickness of the fifth dielectric layer 405. In the embodiment of the present application, the thickness of the black matrix layer 20 is totally controlled by setting the metal layers and dielectric layers to different thicknesses. In addition, the black matrix layer 20 can control the distance between the black matrix layer 20 and the metal trace 207, while it prevents the adjacent color resists from color mixture. Further, the black matrix layer 20 controls the light-exiting angle.

In the embodiment of the present application, the thickness of the third dielectric layer 401 may be set to 10 nm, the thickness of the second metal layer 402 may be set to 100 nm, the thickness of the fourth dielectric layer 403 may be set to 50 nm, the thickness of the third metal layer 404 may be set to 10 nm, and the thickness of the fifth dielectric layer 405 may be set to 50 nm.

In this embodiment of the present application, the materials of the second metal layer 402 and the third metal layer 404 are the same, for example, the materials of the second metal layer 402 and the third metal layer 404 may be metallic tungsten or other metal materials having a reflective effect.

Further, in the first reflective layer 222, the thickness of the first metal layer 303 may be greater than the thickness of the first dielectric layer 301, the thickness of the first metal layer 303 is greater than the thickness of the second dielectric layer 302. Preferably, the thickness of the first dielectric layer 301 and the second dielectric layer 302 may be set to be the same.

Meanwhile, in the embodiment of the present application, the thickness of the second metal layer 402 is greater than the thickness of the first metal layer 303, and the thickness of the first metal layer 303 is greater than the thickness of the third metal layer 404. By setting the metal layers in different reflective layers to different thicknesses, when the lights are reflected by the reflective layers, the effect thereof is effectively ensured, and at the same time, the performance of the black matrix layer is ensured.

In the embodiment of the present application, the material of the first metal layer 303 is different from the materials of the second metal layer 402 and the third metal layer 404. Specifically, the material of the first metal layer 303 may be metallic silver, gold or other metal material having a certain reflective effect. Meanwhile, the second metal layer 402 and the third metal layer 404 may be provided as the same metal material, such as metallic tungsten.

In the embodiment of the present application, the thickness of the first metal layer 303 may be set to 50 nm, the thickness of the first dielectric layer 301 is set to 20 nm, and the thickness of the second dielectric layer 302 is set to 20 nm. In the embodiment of the present application, the thickness of each of the layers in the reflective layers is controlled so that each of the layers has a different thickness, thereby ensuring the light-shielding effect of the black matrix layer, controlling the distance between the black matrix layer and the metal trace, and controlling the light-exiting angle. In the embodiment of the present application, the light reflectivity of the first reflective layer is 98% or more, and the light reflectivity of the second reflective layer is 2.5%, so that the light-shielding effect of the black matrix layer is ensured.

Further, in the embodiment of the present application, since the light reflectivity of the first reflective layer 222 is greater than the light reflectivity of the second reflective layer 223, light-absorbing particles may be provided in the second reflective layer 223. The light-absorbing particles are provided in the fourth dielectric layer 403 or directly in the fifth dielectric layer 405, for example. When the lights are incident on the light-absorbing particles, the light-absorbing particles can absorb the lights, thereby further ensuring the light-absorbing effect of the second reflective layer 223.

In the embodiment of the present application, the light-absorbing particles may be set to different density in different layers in the reflective layers. Specifically, the light-absorbing particles in the fifth dielectric layer 405 may be denser than the light-absorbing particles in the fourth dielectric layer 403, while the light-absorbing particles in the fourth dielectric layer 403 may be denser than the light-absorbing particles in the third dielectric layer 401. By providing light-absorbing particles of different densities in different layers, the light-absorbing effect of the second reflective layer 223 is ensured, and the comprehensive performance of the display panel is improved.

Figure 3:
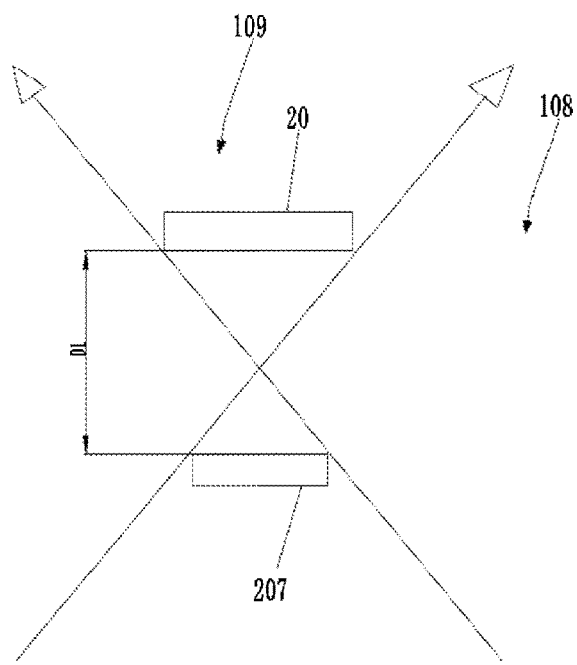
FIG. 3 is a schematic diagram of a transmitting path of lights in the display panel according to an embodiment of the present application.

Further, references are made with FIG. 3, wherein FIG. 3 is a schematic diagram of a transmitting path of the lights in the display panel according to an embodiment of the present application. Combined with the film layer structure in FIG. 1, only part of the film layer structure is shown here. When the lights are transmitted out from the substrate 201 at the bottom of the display panel, the area corresponding to the black matrix layer 20 is the non-open area 109, and the lights vertical to the non-open area 109 cannot be transmitted. However, the lights along the diagonal position between the black matrix layer 20 and the metal trace 207 can be transmitted, as shown in FIG. 3.

In the embodiment of the present application, the thickness of the black matrix layer 20 is set to be less than 1 um. Specifically, the thickness of the black matrix layer 20 may be set to be 270 nm-310 nm, which is less than the thickness of the black matrix layer provided in the existing art. At the same time, since the black matrix layer is set to be with metal layers, the width of the black matrix layer 20 can be further reduced and is much less than the width of the black matrix layer with the resin structure in the existing art. Thus, in the same arrangement area, the display panel has an opening 108 with a greater width, and the aperture ratio of the display panel is effectively improved, thereby improving the light-emitting effect.

Further, in the present embodiment, when the lights are transmitted in the display panel, the lights emitted from the backlight are shielded by the metal traces 207. The lights can be only transmitted upward from the edges of the metal traces 207. The exiting-angle is defined by the two light lines, as shown in FIG. 3.

The width of the metal trace 207 is less than the width of the corresponding black matrix layer 20. The distance between the metal trace 207 and the black matrix layer 20 is D1, and the width of the black matrix layer is C. In the embodiment of the present application, the black matrix layer 20 is provided as a metal layer, so that the width C of the black matrix layer can be effectively reduced. When the width of the metal trace 207 is not changed and the width C of the black matrix layer is reduced, the opening area between the two adjacent black matrix layers 20 can be increased. At the same time, the light-exiting angle of the lights correspondingly emitted at the two edges of the metal trace 207 is increased, thereby effectively improving the light-emitting rate and the aperture ratio of the display panel.

In the embodiment of the present application, the vertical distance between a surface of the black matrix layer 20 close to the thin film transistor array layer 202 and the thin film transistor array layer 202 is less than 3 μm. Preferably, the distance between the metal trace 207 and the black matrix layer 20 is set to be 1.8 μm, and the width of the black matrix layer 20 is set to be greater than 10 μm and less than 100 μm, and the thickness of the black matrix layer 20 is set to be less than 1 μm. Specifically, the width of the black matrix layer 20 is set to be 50 μm, and the thickness of the black matrix layer 20 is set to be 330 nm. Thus, by defining the thickness and the width of the black matrix layer, the light-shielding effect of the black matrix layer is ensured, while the aperture ratio of the display panel is effectively improved, thereby achieving high light-emitting and display effect of the display panel. Meanwhile, since the black matrix layer 20 is thin in thickness, a planarization process can be omitted from the black matrix layer 20, thereby further reducing the thickness of the display panel.

Figure 4:
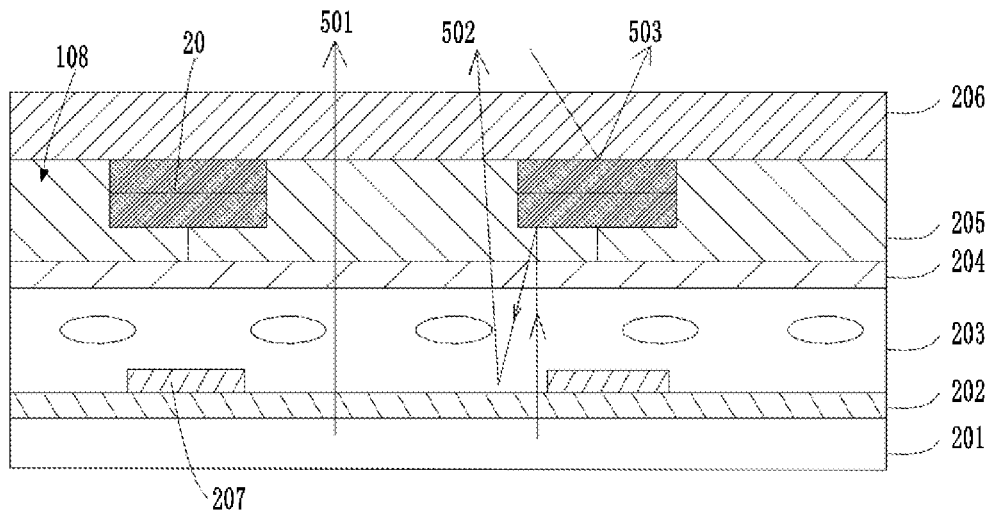
FIG. 4 is a schematic diagram of a transmitting path of lights in the display panel of FIG. 1 according to an embodiment of the present application.

Further, references are made with FIG. 4, wherein FIG. 4 is a schematic diagram of a transmitting path of the lights in the display panel of FIG. 1 in an embodiment of the present application. In the embodiment of the present application, a first light 501, a second light 502, and a third light 503 are taken as example for description.

Specifically, the first light 501 and the second light 502 are sequentially transmitted through different layers and finally transmitted to the outside, and the third light 503 is the light entering the display panel from the outside. Here, the first light 501 can be directly transmitted from the opening 108 to the outside. Since the width of the metal trace 207 is less than the width of the black matrix layer 20, the second light 502 passes by the metal trace 207 to the lower surface of the black matrix layer 20, and the second light 502 is reflected by the lower surface of the black matrix layer 20 back to, for example, the color resist layer and the liquid crystal layer. Then, the second light 502 is reflected again by the substrate 201 into the opening 108, and transmitted from the opening 108 to the outside. In the embodiment of the present application, the side of the black matrix layer 20 close to the liquid crystal layer 203 has a high light reflectivity than the side of the black matrix layer 20 away the liquid crystal layer 203. Therefore, most of the second light 502 is reflected back, and transmitted out of the display panel from the opening 108 after further reflections, thereby effectively increasing the light utilization rate of the lights in the panel. In the embodiment of the present application, the light utilization rate can reach more than 70%. Therefore, the light-emitting effect of the display panel is ensured, and the comprehensive performance of the panel is improved.

At the same time, the third light 503 is reflected by the upper surface of the black matrix layer 20. In this embodiment of the present application, since the light reflectivity of the upper surface of the black matrix layer 20 is low, most of the third light is absorbed by the upper surface of the black matrix layer 20, and only a small amount of the third light is reflected to the outside, thereby ensuring the display effect of the display panel.

Further, details are shown in FIGS. 5-8, which are schematic diagrams of a film layer structure corresponding to a preparation process according to an embodiment of the present application. In the embodiment of the present application, when the display panel corresponding to the above-mentioned film layer structure is prepared, the film layer structure of the black matrix layer in FIG. 2 is described as an example.

Figure 5:
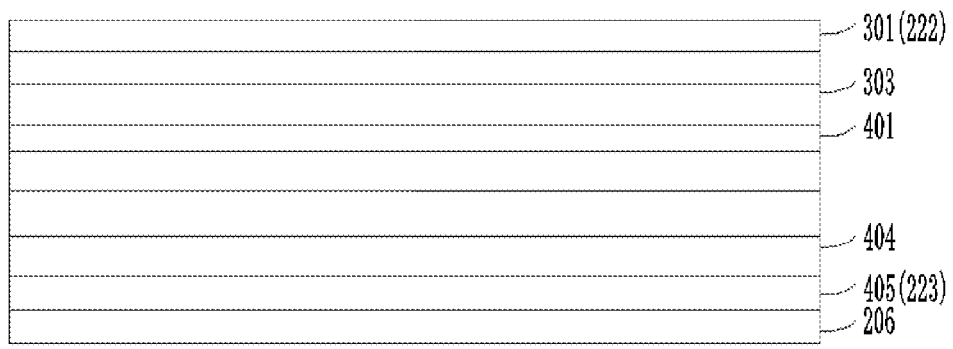
FIGS. 5-8 are schematic diagrams of a film layer structure corresponding to a preparation process according to an embodiment of the present application.

As shown in FIG. 5, the first base 206 is provided, the second reflective layer 223 is deposited on the first base 206, and the first reflective layer 222 is deposited on the second reflective layer 223. Specifically, the fifth dielectric layer 406, the third metal layer 404, the fourth dielectric layer 403, the second metal layer 402, the third dielectric layer 401, the first metal layer 303, the second dielectric layer 302, and the first dielectric layer 301 are sequentially deposited on the first base 206. The thickness and relationship of the above layers are set according to the parameters in the embodiment of the present application.

Figure 6:
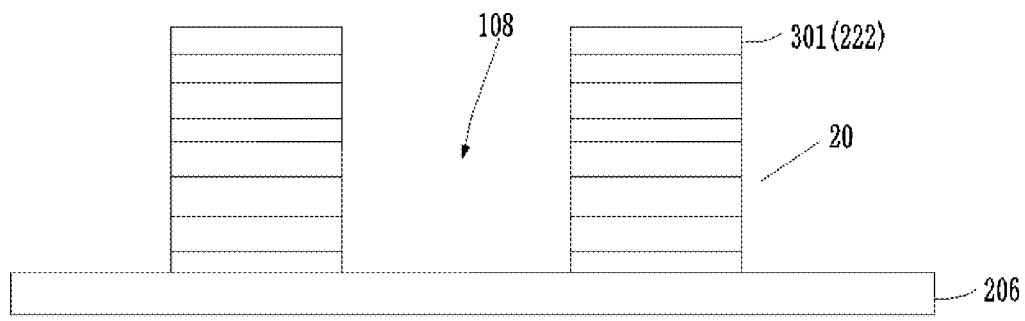

As shown in FIG. 6, after depositing the above layers, each layer on the first base 206 is subjected to an etching process to form a plurality of openings 108. Finally, the black matrix layer 20 provided in an embodiment of the present application is formed.

Figure 7:
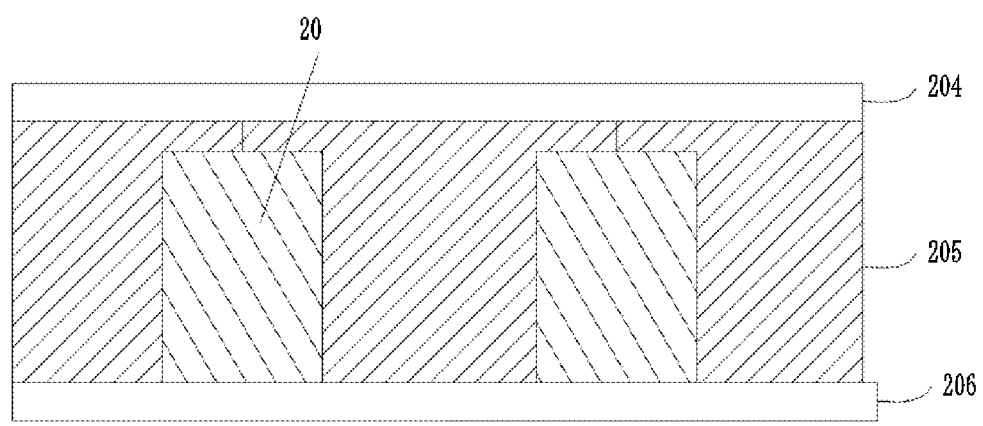

As shown in FIG. 7, after preparing the black matrix layer 20, the color resist layer 205 of different colors may be deposited in the area corresponding to the opening 108. The color resist layer 205 may be set according to the structure and parameters provided in the embodiment of the present application, and details are not described herein.

After preparing the color resist layer 205, a passivation layer 204 is prepared on the color resist layer 205. At this time, the above layers form a color film substrate of the display panel provided in the embodiment of the present application.

Figure 8:
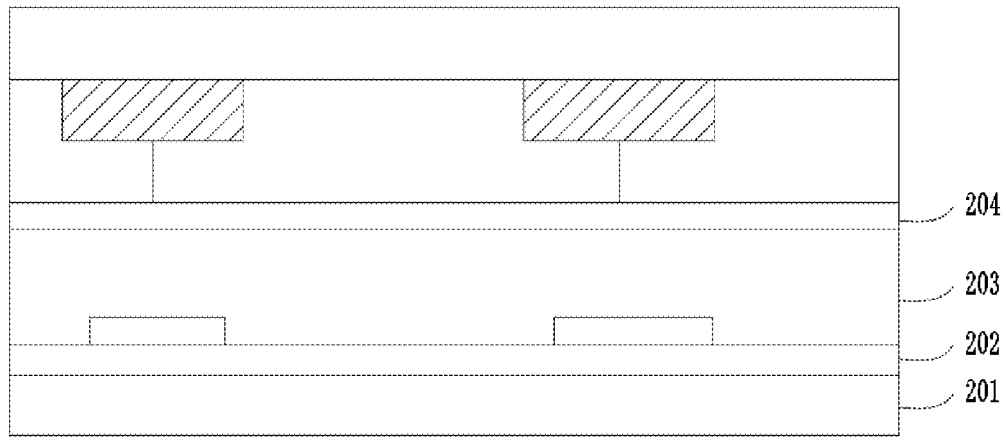

As shown in FIG. 8, in an embodiment of the present application, the color film substrate and other layers, such as the liquid crystal layer 203 and the array substrate, are formed into a cell. Finally, the display panel provided in the embodiment of the present application is formed. This simplifies the manufacturing process of the display panel, reduces the number of the processes by photomask, and improves the aperture ratio of the display panel, that is, the display effect.

Figure 9:
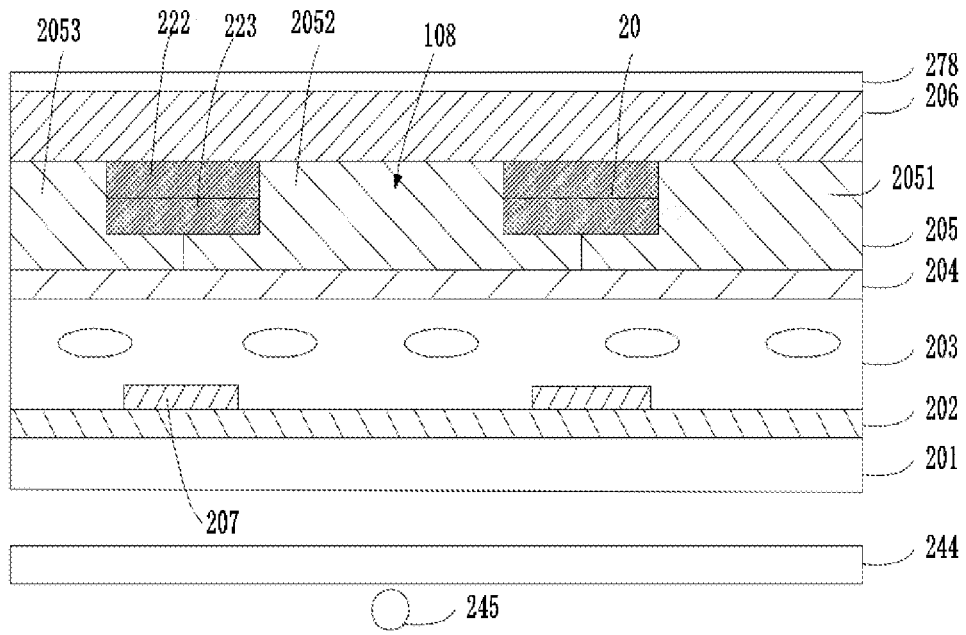
FIG. 9 is a schematic diagram of a display module according to an embodiment of the present application.

Further, as shown in FIG. 9, an embodiment of the present application further provides a display module including a display panel as in the above-described embodiment. The display module further includes a light-guiding plate 244 provided at the bottom of the substrate 201, and a light source 245. The lights emitted from the light source 245 enters the light-guiding plate 244, and the light-guiding plate 244 further guides the lights to the substrate 201 and the layers in the display panel. In the embodiment of the present application, in a case that the display module structure is provided, the backlight corresponding to the display module may be provided as a direct backlight or a side-type backlight. In a case that the display module is provided with a direct backlight, the lights emitted from the light source 245 can directly enter the corresponding light-guiding plate, and the light-guiding plate further transmits the light upward, and the lights sequentially enters the layers in the display panel. In a case that the display module is provided with a side-type backlight, the light source 245 is located on the side of the light-guiding plate, and the lights emitted from the light source 245 can enter the light-guiding plate 244 from the side. Then the light-guiding plate guides the lights to enter the other layers in the display panel.

Further, an embodiment of the present application further provides a display device. The display device includes a display panel and a display module according to an embodiment of the present application. In a case that the display panel is provided, the display panel includes the black matrix layer according to the above embodiment of the present application. When the lights are transmitted in the display panel, the lights are reflected by the black matrix to obtain a high utilization rate. Thus, the display device has a good display effect and comprehensive performance.

In the embodiments of the present application, the display panel and the corresponding display device may be any product or component having a display function or a touch function, such as a mobile phone, a computer, an electronic paper, a display, a notebook computer, or a digital photo frame, and a specific type thereof is not specifically limited.

A display panel, a display module, and a display device according to an embodiment of the present application are described in detail. The principles and embodiments of the present application are described herein using specific examples. The description of the above embodiment is merely provided to help understand the technical solution and the core idea thereof. Although the present application has been described by preferred embodiments, the foregoing preferred embodiments are not intended to limit the present application. Those skilled in the art is able to make various changes and modifications without departing from the spirit and scope of the present application, and therefore the scope of the present application is based on the scope defined in claims.

What is claimed is:

1. A display panel, comprising:
   a first base;
   a black matrix layer disposed on the first base, wherein the black matrix layer includes a plurality of openings; and
   a color resist layer disposed on the first base and filled in the plurality of openings;
   wherein the black matrix layer comprises a first reflective layer and a second reflective layer, the second reflective layer is disposed on the first base, and the first reflective layer is disposed on a side of the second reflective layer away from the first base;

wherein a light reflectivity of the first reflective layer is greater than a light reflectivity of the second reflective layer; the first reflective layer and the second reflective layer each comprise at least one metal layer; and a number of metal layers in the second reflective layer is greater than a number of metal layers in the first reflective layer.

2. The display panel of claim 1, wherein the first reflective layer comprises:
a first dielectric layer;
a second dielectric layer disposed on the first dielectric layer; and
a first metal layer disposed on the second dielectric layer;
wherein the second reflective layer comprises:
a third dielectric layer disposed on the first metal layer;
a second metal layer disposed on the third dielectric layer;
a fourth dielectric layer disposed on the second metal layer;
a third metal layer disposed on the fourth dielectric layer; and
a fifth dielectric layer disposed on the third metal layer and adhered to the color resist layer.

3. The display panel of claim 2, wherein the first metal layer is made of any one of gold and silver, and the second metal layer and the third metal layer are made of same metal material.

4. The display panel of claim 2, wherein a thickness of the second metal layer is greater than a thickness of the first metal layer and a thickness of the third metal layer, and the thickness of the first metal layer is greater than the thickness of the third metal layer.

5. The display panel of claim 4, wherein the thickness of the second metal layer is greater than a thickness of the third dielectric, a thickness of the fourth dielectric layer, and a thickness of the fifth dielectric layer.

6. The display panel of claim 5, wherein the thickness of the third metal is less than the thickness of the fourth dielectric layer and the thickness of the fifth dielectric layer, and the thickness of the third dielectric is less than the thickness of the fourth dielectric layer and the thickness of the fifth dielectric layer.

7. The display panel of claim 6, wherein the thickness of the first metal layer is greater than a thickness of the first dielectric layer and a thickness of the second dielectric layer.

8. The display panel of claim 7, wherein the second reflective layer further comprises light-absorbing particles.

9. The display panel of claim 8, wherein the light-absorbing particles are included in the fourth dielectric layer or the fifth fourth dielectric layer.

10. The display panel of claim 8, wherein the light-absorbing particles are included in the third dielectric layer, the fourth dielectric layer and the fifth fourth dielectric layer; wherein the light-absorbing particles included in the fifth dielectric layer are denser than the light-absorbing particles included in the fourth dielectric layer, and the light-absorbing particles included in the fourth dielectric layer are denser than the light-absorbing particles included in the third dielectric layer.

11. The display panel of claim 1, wherein the light reflectivity of the first reflective layer is greater than 95%, and the light reflectivity of the second reflective layer is less than 5%.

12. The display panel of claim 1, wherein a width of the black matrix layer ranges from 10 μm to 100 μm, and a thickness of the black matrix layer is less than 1 μm.

13. The display panel of claim 1, wherein the display panel further comprises:
a substrate,
a thin film transistor array layer disposed on the substrate,
a liquid crystal layer disposed on the thin film transistor array layer,
a metal trace disposed on the thin film transistor array layer and covered by the liquid crystal layer, and
a passivation layer disposed on the liquid crystal layer;
wherein a width of the black matrix layer is greater than a width of the metal trace.

14. A display module, comprising the display panel of claim 1, a light-guiding plate and a light source, wherein the light-guiding plate is disposed under the display panel, and the light source is disposed under the light-guiding plate.

15. The display module of claim 14, wherein the black matrix layer comprises a first reflective and a second reflective layer, the second reflective layer is disposed on the first base, and the first reflective layer is disposed on a side of the second reflective layer away from the first base;
wherein a light reflectivity of the first reflective layer is greater than a light reflectivity of the second reflective layer.

16. The display module of claim 15, wherein the first reflective layer comprises:
a first dielectric layer;
a second dielectric layer disposed on the first dielectric layer; and
a first metal layer disposed on the second dielectric layer;
wherein the second reflective layer comprises:
a third dielectric layer disposed on the first metal layer;
a second metal layer disposed on the third dielectric layer;
a fourth dielectric layer disposed on the second metal layer;
a third metal layer disposed on the fourth dielectric layer; and
a fifth dielectric layer disposed on the third metal layer and adhered to the color resist layer.

17. The display module of claim 16, wherein a thickness of the second metal layer is greater than a thickness of the first metal layer and a thickness of the third metal layer, and the thickness of the first metal layer is greater than the thickness of the third metal layer;
wherein the thickness of the second metal layer is greater than a thickness of the third dielectric, a thickness of the fourth dielectric layer, and a thickness of the fifth dielectric layer;
wherein the thickness of the third metal is less than the thickness of the fourth dielectric layer and the thickness of the fifth dielectric layer, and the thickness of the third dielectric is less than the thickness of the fourth dielectric layer and the thickness of the fifth dielectric layer;
wherein the thickness of the first metal layer is greater than a thickness of the first dielectric layer and a thickness of the second dielectric layer.

18. A display panel, comprising:
a first base;
a black matrix layer disposed on the first base, wherein the black matrix layer includes a plurality of openings; and
a color resist layer disposed on the first base and filled in the plurality of openings;
wherein the black matrix layer comprises a first reflective layer and a second reflective layer, the second reflective layer is disposed on the first base, and the first reflective layer is disposed on a side of the second reflective layer away from the first base;

wherein a light reflectivity of the first reflective layer is greater than a light reflectivity of the second reflective layer; and the first reflective layer and the second reflective layer each comprise at least one metal layer;

wherein the first reflective layer comprises:

a first dielectric layer;

a second dielectric layer disposed on the first dielectric layer; and a first metal layer disposed on the second dielectric layer;

wherein the second reflective layer comprises:

a third dielectric layer disposed on the first metal layer;

a second metal layer disposed on the third dielectric layer;

a fourth dielectric layer disposed on the second metal layer;

a third metal layer disposed on the fourth dielectric layer; and a fifth dielectric layer disposed on the third metal layer and adhered to the color resist layer.

19. A display module, comprising a display panel, a light-guiding plate and a light source, wherein the light-guiding plate is disposed under the display panel, and the light source is disposed under the light-guiding plate;

wherein the display panel, comprising:

a first base;

a black matrix layer disposed on the first base, wherein the black matrix layer includes a plurality of openings; and a color resist layer disposed on the first base and filled in the plurality of openings;

wherein the black matrix layer comprises a first reflective layer and a second reflective layer, the second reflective layer is disposed on the first base, and the first reflective layer is disposed on a side of the second reflective layer away from the first base;

wherein a light reflectivity of the first reflective layer is greater than a light reflectivity of the second reflective layer;

wherein the first reflective layer comprises:

a first dielectric layer;

a second dielectric layer disposed on the first dielectric layer; and a first metal layer disposed on the second dielectric layer;

wherein the second reflective layer comprises:

a third dielectric layer disposed on the first metal layer;

a second metal layer disposed on the third dielectric layer;

a fourth dielectric layer disposed on the second metal layer;

a third metal layer disposed on the fourth dielectric layer; and a fifth dielectric layer disposed on the third metal layer and adhered to the color resist layer.

20. The display module of claim 19, wherein a thickness of the second metal layer is greater than a thickness of the first metal layer and a thickness of the third metal layer, and the thickness of the first metal layer is greater than the thickness of the third metal layer;

wherein the thickness of the second metal layer is greater than a thickness of the third dielectric, a thickness of the fourth dielectric layer, and a thickness of the fifth dielectric layer;

wherein the thickness of the third metal is less than the thickness of the fourth dielectric layer and the thickness of the fifth dielectric layer, and the thickness of the third dielectric is less than the thickness of the fourth dielectric layer and the thickness of the fifth dielectric layer;

wherein the thickness of the first metal layer is greater than a thickness of the first dielectric layer and a thickness of the second dielectric layer.

\* \* \* \* \*